INVENTOR
HARRY GROSS

United States Patent Office 3,492,566
Patented Jan. 27, 1970

3,492,566
THREE DIMENSIONAL MAGNETIC ANISOTROPIC SUSCEPTIBILITY METER
Harry Gross, Ottawa, Ontario, Canada, assignor to Canadian Patents and Development Limited, Ottawa, Ontario, Canada, a corporation of Canada
Filed Sept. 1, 1967, Ser. No. 665,008
Int. Cl. G01r 33/00; G01n 27/00
U.S. Cl. 324—34                     10 Claims

ABSTRACT OF THE DISCLOSURE

An apparatus consisting of an exciter coil to establish an alternating uniform magnetic field throughout a specimen and a detector coil at right angles to the exciter coil and a rotatable shaft for mounting the specimen. By correlating the specimen rotation with detector coil voltage variation and then re-orienting the specimen and again correlating the rotation complete values of the magnitudes and directions of the axes of anisotropy are obtained.

This invention relates to an apparatus useful in assessing the magnetic characteristics of minerals. In general, the apparatus is used as an instrument for determining susceptibility in various directions and the direction in which the variations are a maximum.

Magnetic alternating current methods of measuring such variations of susceptibility fall into two main classes. The first measures anisotropic susceptibility by the mechanical effect of the magnetic field on a sample. Typically the torsion balance method suffers from the usual disadvantages of mechanical methods such as limited and unadjustable sensitivity, torsional hysteresis and possible instability, limitations on the size of the sample suspended from the torsion strip and the difficulty of very accurate mechanical measurements with delicate apparatus.

The second class measures the variation in susceptibility electrically by determining in principle the change of inductance of a coil. A typical procedure is to balance a coil containing a sample on an inductance bridge and to measure the unbalance as the sample is rotated within the coil. A variation of this is to rotate the sample in the air gap of a transformer, the measurement of the unbalance being correlated with sample rotation as before.

This second class, in essence, measures susceptibility by a small change in a large value with resulting difficulty in performance; attempts have been made to improve performance by bridge design.

It is an object of this invention to provide a rigid compact coil structure for determining susceptibility.

It is a further object of this invention to provide a coil system which is not dependent upon a balanced electrical bridge for its operation.

It is yet another object of this invention to provide a structure which will allow magnetic measurements with negligible temperature drift effects.

It is yet another object of this invention to measure the anisotropy of the susceptibility of a substance.

It is a further object of this invention to enable the anisotropy of a magnetically susceptible material to be portrayed and recorded.

Further objects and advantages of this invention will be apparent on reading the following disclosure and the attached drawings in which.

Before describing an exemplary embodiment of the invention, it should be stated as common knowledge that in addition to magnetic anisotropy of the material there is also magnetic anistropy of form. The latter is truly zero only for spherical samples but for ease of preparation of samples a cylinder with proportions of height= 0.7×diameter is usually accepted by convention as being a good approximation to the desired spherical form.

Figure 1:
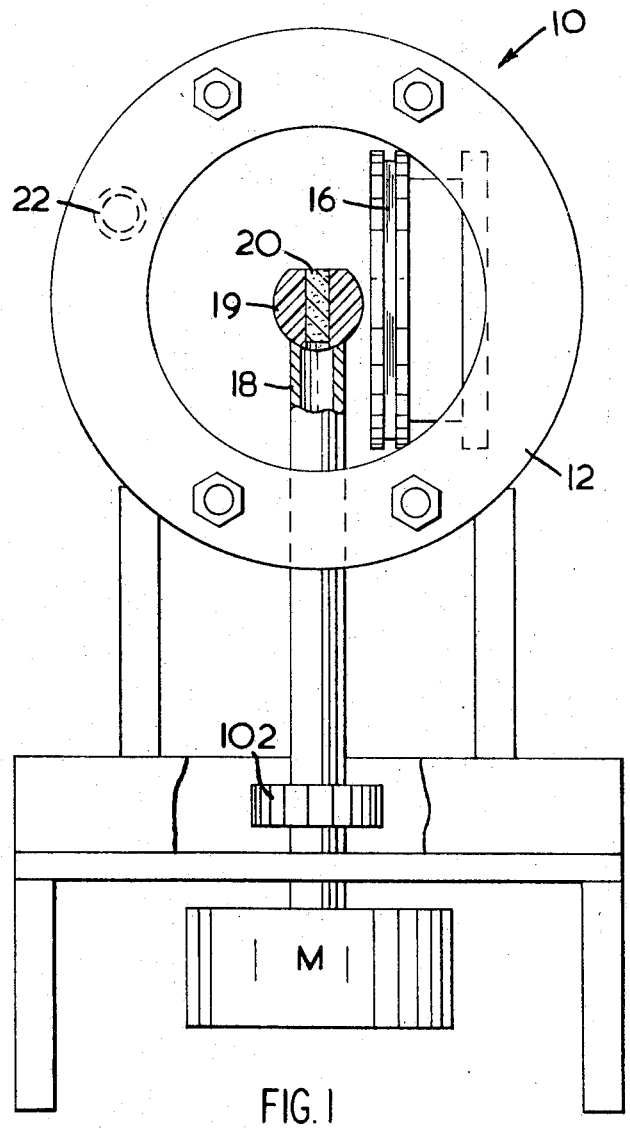
FIGURE 1 shows an elevation in part section of a double exciter coil and a detector coil at right angles to the exciter coil.
Figure 2:
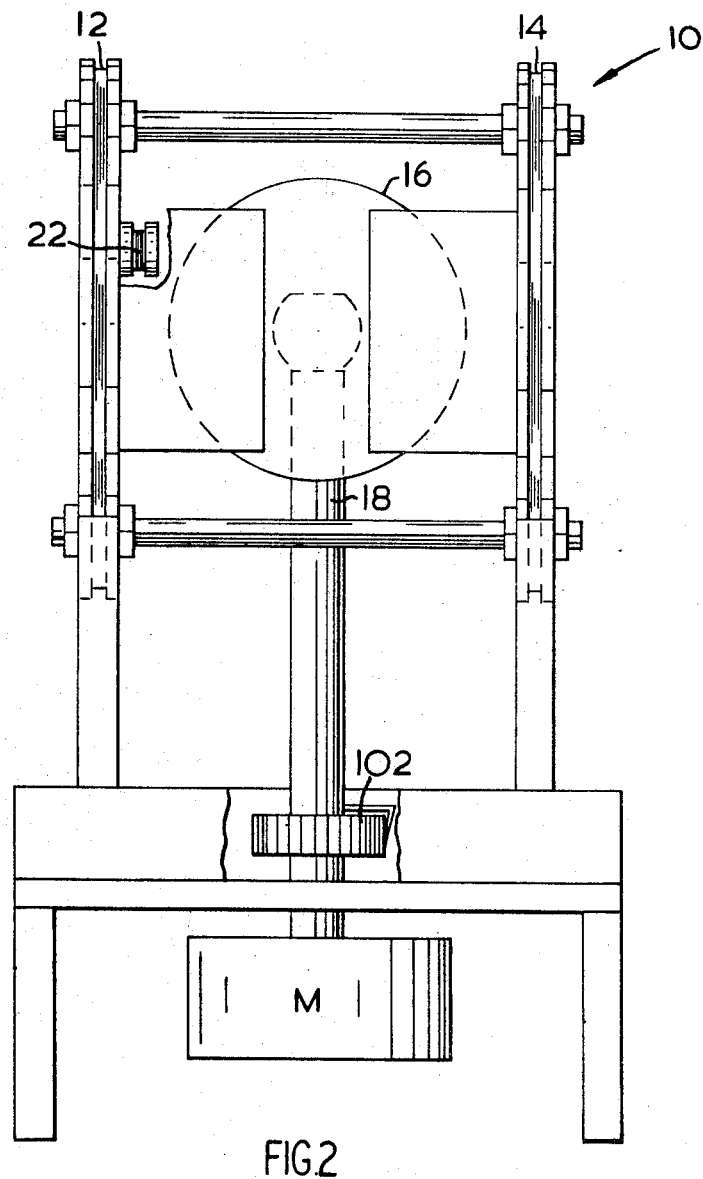
FIGURE 2 shows a side elevation of the assembly of FIGURE 1.

Referring now to FIGURES 1 and 2, an embodiment suitable for laboratory determination of anisotropic susceptibility is shown generally at 10. Exciter coils 12, 14 establish a uniform alternating field throughout the intercoil space. Detector coil 16 is fixed at right angles to and between the planes of these coils and is preferably, but not necessarily, offset from their central axis. A shaft 18, on which is mounted a spherical chuck 19 for holding a cylindrical specimen 20, is free to rotate about its central longitudinal axis in bearings which prevent axial and transverse movement. The exact position of the specimen relative to the central axes of coils 12, 14 and 16 is not critical. The specimen holder may be rotated by any convenient means M such as clockwise, electric motor or even manually providing jerky rotation is eliminated by flywheel, gearing damping, or similar devices. Coil 22 is a reference to determine the phase of a signal with reference to the oscillator.

Figure 3:
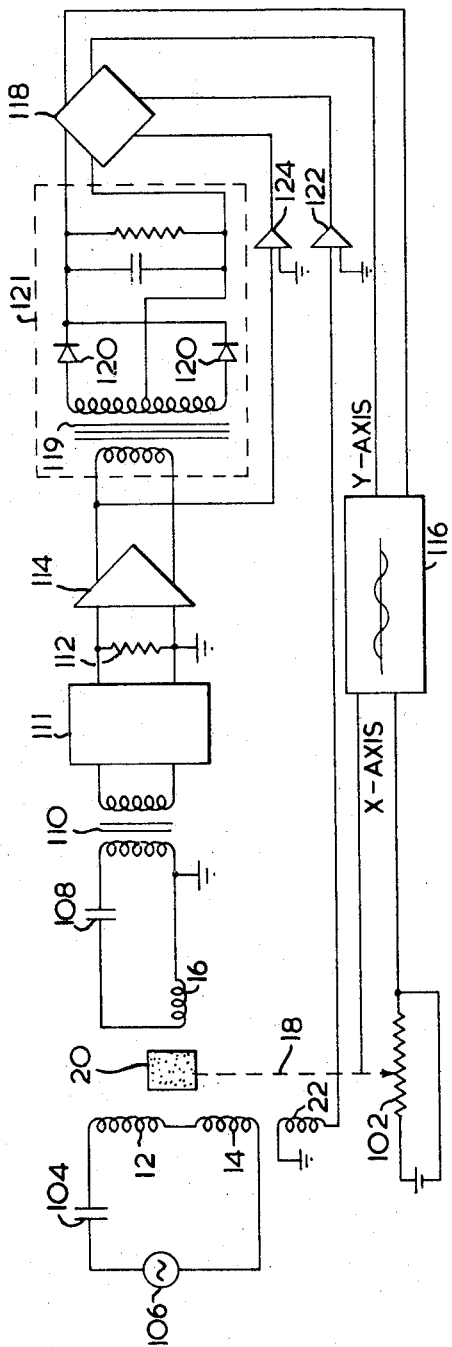
FIGURE 3 shows a circuit diagram of the arrangement of coils and recording device.

Referring now to FIGURE 3, the circuit diagram shows the coils 12, 14 represented symbolically and the coil 16 and the coil 22 also symbolically represented. The angular position of coils 12, 14 and 16 is correct but the shaft 18 represented by a chain dotted line has angular limitations explained below. Potentiometer 102 indicates angular position of specimen 20.

The coil 12, 14 is tuned by capacitor 104 to a frequency which is not critical. A convenient frequency is 1 kc., and which is supplied by a 1 kc. oscillator 106.

Similarly coil 16 is tuned by capacitor 108 to 1 kc. and any output is fed through matching transformer 110 through a 1 kc. filter 111 to develop a voltage across resistor 112 for application to an amplifier 114. The output voltage from this amplifier is stepped up by transformer 119 to minimize the non-linearity of rectifier 120 in circuit 121. The rectified signal is then fed to a recorder 116 which may be a cathode ray tube or a simple pen type instrument. The function of phase sensitive detector 118 which may be an HR–8 lock in amplifier as sold by Princeton Applied Research or an equivalent type is solely to ensure that the DC output fed to the recorder is in the correct polarity. This is done by comparing the output of coil 22, amplified by amplifier 122 with that of the input to circuit 121 also suitably amplified by amplifier 124. Such comparison could be shown on an oscilloscope and the DC polarity corrected manually by a switch; but I prefer to use a phase sensitive detector for fast mechanized operation.

It will now be evident that, in principle, in the absence of any magnetic material there will be no coupling between coil 12, 14 and coil 16, and dimensional changes will not alter the angle between the coil planes. Furthermore, truly isotropic material of spherical shape (or the conventional approximation thereto) will also have no resolute of magnetic force normal to the axis of the coil 12, 14 and will therefore produce no signal in the detector coil 16, and the output as shown in the recorder will be a straight line along the XX axis. However, isotropic samples of known susceptibility may be used to calibrate the apparatus by using a specimen of known anisotropy of shape such an ellipsoid with its longest axis at a predetermined angle to both coils.

Alternatively, the apparatus may be calibrated by the use of a calibration coil having a particular dipole moment in place of the specimen. The current in the calibration coil may then be adjusted to give a permeability curve from which the susceptibility may be calculated.

It will be understood that a massive conductive body will usually have no resolute of magnetic force normal to the axis of the coil 12, 14, since it will act as a series of short circuited turns parallel to the coil 12, 14. However, a thin closed conductive loop at an intermediate angle to both exciter and detector coils may give anomalous readings in one plane of rotation; but this type of conduction is exceedingly rare in rock samples and may for all practical purposes be neglected.

To determine the anisotropic susceptibility of any sample it is placed in the spherical chuck 19. The chuck is then mounted on the shaft 18, and the shaft is then rotated through 360° and the relationship of susceptibility to angular rotation is determined. As explained below for accurate measurement this 360° rotation is accomplished in 5° or 10° increments for convenience of measurement rather than a continuous sweep.

After one shaft rotation has been completed the chuck is turned 120° upon the spherical seat of the shaft about predetermined axis preferably forming an angle having a cosine of $1\sqrt{3}$ or approximately 54.7° to the axis of rotation to reposition the specimen for a second set of rotational increments. The word "turn" has been used in this context to indicate relative motion of spherical chuck 19 and its seat, the word "rotation" being reserved in this context for revolving of the shaft 18 about its longitudinal axis. For convenience the axis of turning may be an axis normal to a plane of one of the coils but any axis at right angles to the axis of rotation will suffice.

The shaft 18 is then again rotated about its longitudinal axis through 360° and the variation of susceptibility with angular rotation for a second specimen orientation is obtained.

The chuck 19 is then turned a further 120° upon the shaft 18 about the same axis relative to the axis of rotation of the shaft. The shaft 18 is then rotated a third time and from the third rotation the variation of susceptibility for a third specimen orientation is obtained.

The information thus obtained will enable the axes of anisotropy of the susceptibility and their magnitudes to be determined. This can be done either mathematically by calculation, or else by programming on to a computer.

It will now be evident that this procedure gives an accurate analysis of a standard laboratory sample with exceedingly complex material anisotropic susceptibility.

Having described a preferred embodiment it will be evident that many other changes may be made. In particular, the orientation of the axis of rotation of the shaft 18 is not critical and need not be orthogonal with the central axes of the exciter or detector coils. However, the axis of rotation must be at an appreciable angle from the central axis of both coils. The central axes of the exciter and detector coils need not intersect, nor need either axis pass through the specimen, and eccentricity of the specimen to the axis of rotation of the shaft is permissible; however all these latitudes make extraction of results more complex.

The exciter coil need not be of the Helmholtz type, but could be a single coil encompassing—or even adjacent to—the specimen so long as the field is substantially uniform throughout the specimen. The leads from the coils need not be shielded but can be twisted to prevent undue pick up.

In the circuit diagram many changes are possible; for instance the coils need not be tuned in the absence of electrical noise. Other AC generators besides an oscillator are possible. Furthermore, it is not usually necessary to take a trace as shown and a series of points at 5° or 10° increments of shaft rotation are usually sufficient. This reduces time for a traverse since a few moments are necessary in practice to enable amplifier 114 to settle at each reading. These voltage readings at specific points may be correlated with the voltage proportional to rotation and the values fed to a computer.

Although the invention has been described with reference to examples and drawings, it will be obvious to those skilled in the art that numerous changes in the detail construction and arrangement may be made without departing from the spirit and scope of the invention as defined by the appended claims.

I claim:
1. A three dimensional magnetic anisotropic susceptibility meter comprising:
   at least one exciter coil,
   a detector coil, the central axis of said detector coil and the central axis of said exciter coil being substantially orthogonal,
   a rigidly supported incrementally rotatable shaft having one end within the space common to the normal projections of said exciter coil and said detector coil, the axis of rotation of said shaft being at an appreciable angle to the central axis of both said detector coil and said exciter coil, and
   a chuck for holding a magnetic specimen of substantially zero magnetic anisotropy of form,
   said chuck being mounted on said shaft, and rotatable therewith, at said one end,
   said chuck and said shaft end having cooperating means to enable said chuck to be turned about an axis at a predetermined angle to the shaft axis.

2. A three dimensional magnetic anisotropic susceptibility meter as claimed in claim 1 in which the axis of shaft rotation is orthogonal to both the central axis of both said exciter coil and said detector coil.

3. A three dimensional magnetic anisotropic susceptibility meter as claimed in claim 1 or claim 2 in which the predetermined angle between the axis of rotation of the shaft and the axis about which the chuck is turned is 54.7°.

4. A three dimensional magnetic anisotropic susceptibility meter as claimed in claim 1 in which the detector coil is offset from the central axis through said exciter coil.

5. A three dimensional magnetic anisotropic susceptibility meter comprising:
   at least one exciter coil,
   an alternating current generator connected to said exciter coil.
   a detector coil, the central axis of said detector coil and the central axis of said exciter coil being substantially orthogonal,
   a means for measuring the voltage induced in said detector coil,
   a rigidly supported incrementally rotable shaft having one end within the space common to the normal projections of said exciter coil and said detector coil, the axis of rotation of said shaft being at an appreciable angle to the central axis of both said detector coil and said exciter coil, and
   a chuck for holding a magnetic specimen of substantially zero magnetic anistrophy of form,
   said chuck being mounted on said shaft and rotatable therewith at said one end,
   said chuck and said shaft end having cooperating means to enable said chuck to be turned about an axis at a predetermined angle relative to the shaft axis.

6. A three dimensional magnetic anisotropic susceptibility meter as claimed in claim 5 in which the axis of shaft rotation is orthogonal to both the central axis of both said exciter coil and said detector coil.

7. A three dimensional magnetic anisotropic susceptibility meter as claimed in claim 5 or claim 6 in which the predetermined angle between the axis of rotation of the shaft and the axis about which the chuck is turned is 54.7°.

8. A three dimensional magnetic anisotropic susceptibility meter as claimed in claim 5 in which the detector coil is offset from the central axis through said exciter coil.

9. A three dimensional magnetic anisotropy susceptibility meter comprising:

two coaxial spaced apart exciter coils connected so as to provide when energized a substantially uniform magnetic field therebetween, an electronic oscillator connected to said exciter coils, a detector coil located between said exciter coils, the central axis of said detector coil and said exciter coils being orthogonal, the detector coil ends being offset from the central axis of said exciter coils, a means for measuring the voltage induced in said detector coil including a rectifying means and a recording means, a rigidly supported incrementally rotatable shaft having one end within the space between said two exciter coils and within the normal projection of said detector coil, the axis of rotation of said shaft being orthogonal to the central axes of said exciter coils and said detector coil, a chuck for holding a magnetic specimen of substantially zero magnetic anisotropy of form, said chuck being mounted on said shaft and rotatable therewith at said one end, said chuck and said shaft end having cooperating means to enable said chuck to be turned about an axis at a predetermined angle to the shaft axis, a potentiometer having a means for moving the variable contact, the variable contact moving means being attached to said rotatable shaft so as to indicate the angular position thereof, said potentiometer being supplied by a voltage source, a reference coil located adjacent one exciter coil, the central axes of said reference coil and said exciter coils being parallel, and a phase sensitive detector connected to the outputs of said reference coil and said detector coil and connected between the rectifying means and the recording means so as to present rectified voltage of the correct polarity to the recording means, the variable contact and one fixed contact of said potentiometer also being connected to said recording means so that the voltage induced in said detector coil is correlated to the angular position of said rotatable shaft.

10. A three dimensional magnetic anisotropic susceptibility meter as claimed in claim 5 in which the means for measuring the voltage induced in said detector coil comprises a rectifying means and a recording means, and further comprising:

a potentiometer having a means for moving the variable contact, the variable contact moving means being attached to said rotatable shaft so as to indicate the angular position thereof, said potentiometer being supplied by a voltage source, a reference coil located adjacent said exciter coil, the central axes of said reference and exciter coils being substantially parallel, and a phase sensitive detector connected to the outputs of said reference coil and said detector coil and connected between the rectifying means and the recording means so as to present rectified voltage of the correct polarity to the recording means, the variable contact and one fixed contact of said potentiometer also being connected to said recording means so that the voltage induced in said detector coil is correlated to the angular position of the rotatable shaft.

References Cited

UNITED STATES PATENTS

| 3,058,054 | 10/1962 | Henderson | 324—42 |
| 2,334,393 | 11/1943 | Dillon | 324—14 |
| 3,337,797 | 8/1967 | Matay | 324—14 |

OTHER REFERENCES

Cole et al., Flux Instrument for Rapid Comparison of Crystal Anisotropics; Journal of Applied Physics; Supplement to vol. 30, No. 4, April 1959; pp. 250S–251S.

Rossing et al., Method of Measuring the Anisotropy Function of Thin Magnetic Films; The Review of Scientific Instruments; vol. 32, No. 6, June 1961; pp. 752–753.

RUDOLPH V. ROLINEC, Primary Examiner

R. V. CORCORAN, Assistant Examiner

U.S. Cl. X.R.

324—14